(12) United States Patent
Willinger

(10) Patent No.: US 6,217,408 B1
(45) Date of Patent: Apr. 17, 2001

(54) SELF RIGHTING PET TOY

(75) Inventor: Jonathan Willinger, Tenafly, NJ (US)

(73) Assignee: JW Pet Company, Inc., Hasbrouck Heights, NJ (US)

( * ) Notice: Subject to any disclaimer, the term of this patent is extended or adjusted under 35 U.S.C. 154(b) by 0 days.

(21) Appl. No.: 09/342,665

(22) Filed: Jun. 29, 1999

(51) Int. Cl.[7] .......................... A63H 15/06; A01K 29/00
(52) U.S. Cl. .......................... 446/396; 119/707; 119/709
(58) Field of Search .......................... 446/325, 396, 446/326; 119/702, 705, 707, 709, 710, 711

(56) References Cited

U.S. PATENT DOCUMENTS

| | | | |
|---|---|---|---|
| 901,762 | * | 11/1908 | Wetzel .................................. 446/325 |
| 1,425,945 | * | 8/1922 | Congdon . |
| 1,630,137 | * | 5/1927 | Ruwwe . |
| 3,442,045 | * | 5/1969 | Green .................................. 446/325 |
| 3,921,331 | * | 11/1975 | Schatz .................................. 446/325 |

* cited by examiner

Primary Examiner—Jacob K. Ackun
Assistant Examiner—Jeffrey D. Carlson
(74) Attorney, Agent, or Firm—Helfgott & Karas P.C.

(57) ABSTRACT

A molded rubber toy is formed with a hemispherical base, a shaft extending upwardly from the base, a spoke-like array of arms extending from the shaft and a bumper formed on the top end of the shaft The arms limit the tipping movement of the base, and the base is heavier than the combined weights of the shaft, arms and bumper so that the weight of the base rolls the toy back onto the center of its spherical base surface and into an upright position when the toy is upset from its upright at-rest position.

8 Claims, 1 Drawing Sheet

SELF RIGHTING PET TOY

BACKGROUND OF THE INVENTION

1. Field of the Invention

The present invention relates in general to chewable pet toys, and in particular to such toys which bounce, roll, spin, oscillate and wobble and always return to an upright orientation when used on a level surface.

2. Description of Prior Developments

Pet toys have long been available in numerous sizes and shapes for providing amusement to various pets. Chewable rubber toys are particularly popular with dogs. Many of these chewable toys remain static when dropped or thrown on a playing surface and, as such, are not particularly interesting to a pet such as a dog.

Although some toys have been designed to bounce and roll, and some have even been designed to remain upright, these conventional toys typically have a multi-component construction which involves assembly of the various parts and are generally expensive to produce.

Accordingly, a need exists for a self-righting, chewable pet toy which is of simple, economical construction and which produces a wide variety of motions, including rolling, bouncing, spinning, oscillating and wobbling.

SUMMARY OF THE INVENTION

The present invention has been designed to fulfill the needs noted above and therefore has as an object the provision of a chewable, self-righting pet toy which has a simple, economical construction and which produces a wide variety of motions including rolling, bouncing, spinning, swaying and oscillating, as well as complex combinations of these movements.

Another object of the invention is to provide a chewable, one-piece, molded rubber pet toy which wobbles and rolls about for a considerable time before standing still in an upright position.

These and other objects are met by the present invention which is directed to a one-piece, homogeneous, chewable rubber pet toy which is constructed with a low center of gravity located within a hemispherical base. A central shaft extends upwardly from the center of the base and is formed with a rounded bumper on its free end. An array of spokes or arms extends radially outwardly from a middle portion of the shaft to prevent the base from tipping over.

The self-righting feature of the invention is provided by limiting the weight of the toy above its hemispherical base to a value less than the weight of the hemispherical base. In this manner, a self-righting restorative moment will always be present to align the toy upright and centered on its hemispherical base.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

Figure 1:
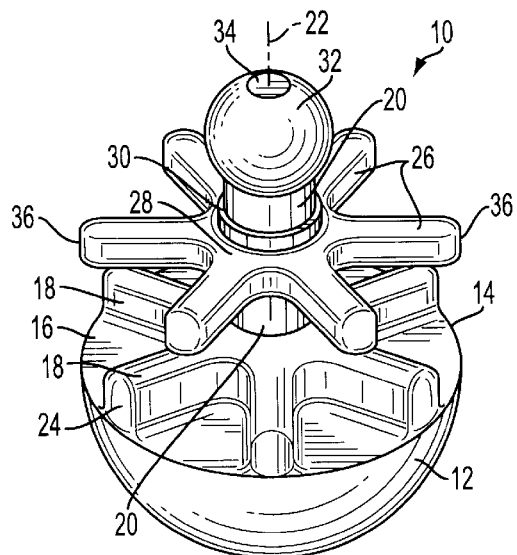
FIG. 1 is a perspective view of a chewable, self-righting pet toy constructed in accordance with the invention and shown at-rest in its upright orientation.

The present invention will now be described in conjunction with the drawings, beginning with FIG. 1 which shows a pet toy 10 constructed in accordance with the invention. Toy 10 is molded as a single, homogeneous, one-piece molding from a plastic or elastomeric material such as synthetic or natural rubber. In this manner, toy 10 is simple and economical to manufacture insofar as no assembly of parts is required. Base 12 is formed as a surface of revolution of a curve or arc, and preferably as shown, as a surface of revolution of a half circle. This produces a hemispherical base 12 having a curved bottom portion which provides a self-righting action to the toy by concentrating the weight of the toy in the base 12. The base 12 extends upwardly to a circular rim 14 which, at times during use of the toy, functions as a wheel-like surface about which toy 10 rolls in a generally circular, or erratic fashion.

The base 12 is provided with a flat upper surface 16 which extends radially inwardly from the rim 14 along a diametral plane which delimits the base. An array of radially-extending raised ribs 18 is molded on surface 16. The ribs are evenly spaced about a central cylindrical shaft 20 having an axis 22 perpendicular to the center of surface 16 and lying on a diameter or radius of a sphere which encompasses the hemisphere of base 12.

Each rib 18 terminates at the rim 14 and has an end wall 24 which extends tangentially upwardly from the rim. The ribs are symmetrically spaced over the upper surface 16 and, in the example shown, six ribs are disposed 60 degrees apart to strengthen and provide added rigidity around the bottom of shaft 20.

Figure 2:
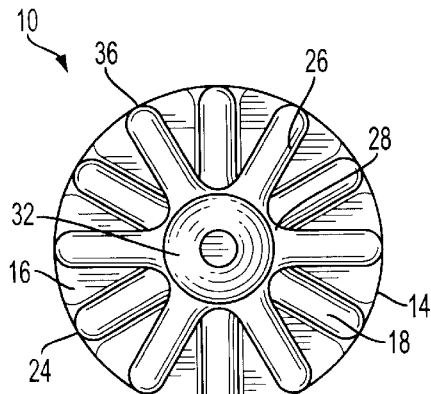
FIG. 2 is a top plan view of the toy of FIG. 1.

About midway along shaft 10, an array of radially-extending spokes or arms 26 projects outwardly from shaft 20 around a hub 28. Each arm 26 extends radially outwardly about as far as, or slightly farther than each of the end walls 24 on ribs 18. As seen in FIG. 2, the arms are symmetrically spaced around shaft 20, and in the example shown, six arms are disposed 60 degrees apart.

As further seen in FIG. 2, the arms 26 are rotated or circumferentially offset from the ribs 18 by 30 degrees, so that as seen in top plan view in FIG. 2, the ribs and arms alternate circumferentially around shaft 20 at 30 degree increments of arc. While the ribs 18 are relatively difficult to deflect or bend, the arms 26 are easily elastically deflected in virtually any direction.

An annular collar 30 is molded to the top of hub 28 around the upper half of shaft 20 which extends upwardly from the collar 30. A bumper 32 is molded on the upper or free end of shaft 20. Bumper 32 may take any shape, however a small spherical nub or ball has been found to function well. Bumper 32 is advantageously dimensioned with a radius larger than that of shaft 20 and significantly less than that of upper surface 16. An optional flat circular end face 34 may be formed on the top of bumper 32.

A significant feature of the invention is the concentration of weight in base 12, and the extension of arms 26 radially outwardly to at least about the same length as the radial length of ribs 18 and rim 14. This structural relationship provides a self-righting force to the toy 10. The concentration of weight in base 10 is such that when the base 12 is tipped over in any direction, as shown by the directional arrows 35 in FIG. 4, the end face 36 of one or two of the arms 26 will limit the extent of tipping by abutting, ground-engaging contact with a playing ground surface 38. At this position, the toy is instantaneously supported by contact with surface 38 along rim 14, and perhaps some contact with one of the rib end faces 24, and by contact with one or two arm end faces 36.

Figure 4:
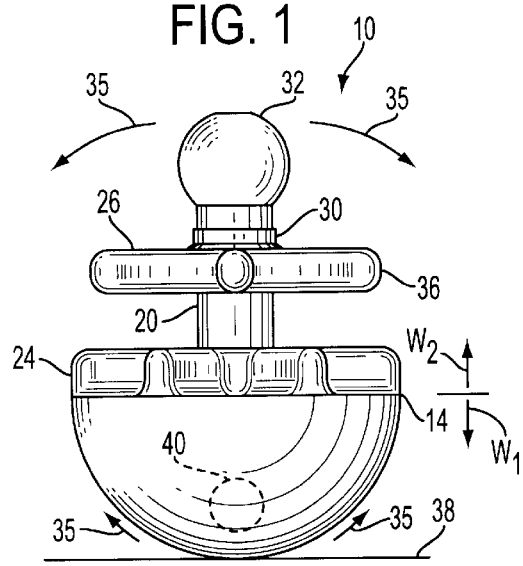
FIG. 4 is a side elevation view of FIG. 2.
Figure 5:
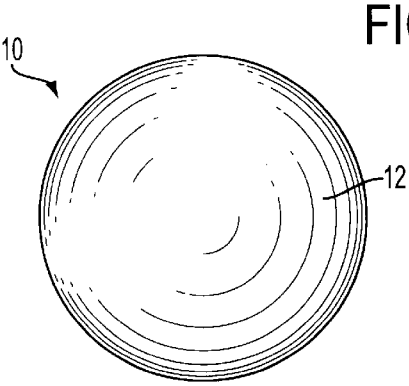
FIG. 5 is a bottom view of FIG. 2.

At this instant, the weight in base 12 produces a greater turning moment about rim 14 than the weight of the toy above rim 14, i.e. above surface 16. Simply stated, $W_1$, the weight of the toy below surface 16 and rim 14 is set greater than the weight $W_2$ above surface 16 and rim 14, as schematically shown in FIG. 4. This is accomplished by dimensioning the base 12 with a volume greater than the volume of the toy located above surface 16 and rim 14.

In this particular embodiment shown in the drawings, the required weight relationship of $W_1$ and $W_2$ is satisfied without the need for additional ballast weight in the base 12. However, the restorative uprighting or return force can be increased by adding weights, such as by insert molding one or more weights 40 in base 12, as further seen in FIG. 4. Although not typically necessary, if used, the weights 40 can be formed of metal or any other high specific weight material to ensure that the base 12 weighs more than the structure projecting upwardly from the base, i.e. the shaft 20, arms 26 and bumper 32.

By extending arms 26 radially outwardly a sufficient distance, the base 12 is prevented from overturning onto the ribs 18. Moreover, by providing the resilient bumper 32 on the end of shaft 20, an elastic rebounding force is generated when the bumper hits support surface 38. This force also tends to restore toy 10 to an upright orientation. Further resistance to overturning onto ribs 18 is provided by the end faces 24 of the ribs themselves. Thus, the arms 26, as well as the shaft 20, end faces 24, and bumper 32 collectively and individually serve as anti-tipping ground or surface engagement structures to limit the tipping of base 12 from its at-rest upright position as shown in the Figures.

The end faces 24 of ribs 18, the end face 36 of arms 26 and bumper 32 individually and mutually increase the moment required to tip the base 12 over on its upper surface 16 or on ribs 18. The longer the length of arms 36, the less tipping of the base 12 will occur before the end face 36 of the arms engages the ground 38. However, in order to provide a wide range of tipping and wobbling movement, the length of arms 26 is set about equal to the radius of the hemisphere of base 12.

Figure 3:
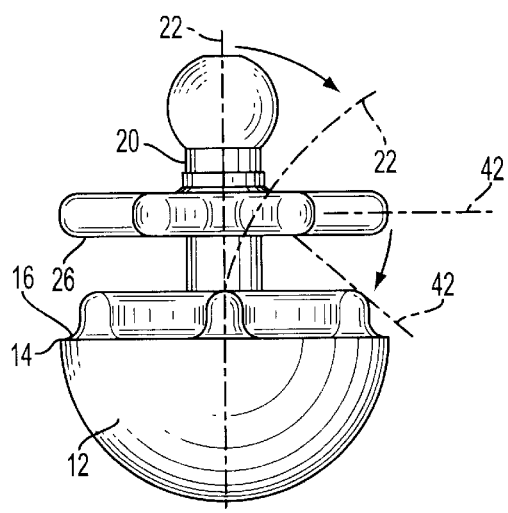
FIG. 3 is a front elevation view of FIG. 2.

It should be noted that shaft 22 and arms 26 are highly flexible when formed of natural or synthetic rubber and can be easily deflected to a considerable extent. For example, as shown in FIG. 3, the central axis 22 of shaft 20 can be deflected radially at least until the arms 26 engage rim 14 or surface 16. Moreover, the arms 26 can be individually deflected as shown by the deflection of axis 42 of arms 26 in FIG. 3, until the undersides or end faces of arms 26 contact surface 16.

When toy 10 is thrown or pushed along a play surface such as ground surface 38, the resilient interaction between base 12, arms 26, bumper 32 and shaft 20 produces a complex bouncing, rolling, jerking and wobbling motion which entices a pet to chase after the toy and bite and chew it. The easily deflected shaft and arms are satisfying to chew and thereby provide an improved dog chew toy which stimulates the jaw of a dog as the toy is chewed There has been disclosed heretofore the best embodiment of the invention presently contemplated. However, it is to be understood that various changes and modifications may be made thereto without departing from the spirit of the invention. For example, the toy 10 can be constructed from two or more parts, such as a separately molded rubber base 12 and an anti-tipping or anti-overturning structure. The anti tipping structure can take the form of a one piece rubber molding which includes shaft 20, arms 26 and bumper 32. This anti-tipping structure can be bonded with adhesive or otherwise fastened to the base 12 to fabricate toy 10.

What is claimed is:

1. A chewable, resilient self-righting pet toy, comprising:
    a hemispherical base having a radius and an upper surface;
    said upper surface having a plurality of radially extending, symmetrically spaced-apart ribs disposed thereon;
    a shaft extending upwardly from said upper surface of said base; and
    a plurality of arms having ends and extending radially outwardly from said shaft;
    whereas said toy has a center of gravity below said upper surface portion so that the toy will resist tipping over.

2. The toy of claim 1, wherein said shaft has a free end portion and further comprising a bumper provided on said free end portion.

3. The toy of claim 1, wherein said arms have a length about equal to the length of said ribs.

4. The toy of claim 1, wherein said toy is formed as a homogeneous, one-piece molding comprising a resilient rubber material.

5. The toy of claim 1, wherein said base weighs more than the combined weight of said shaft and said arms.

6. The toy of claim 1, further comprising a separate weight disposed within said base.

7. A chewable, resilient self-righting pet toy, comprising:
    a base having a curved bottom portion, an upper surface and a plurality of ribs provided on said upper surface, said ribs being symmetrically spaced apart on said upper surface;
    a shaft extending from said base; and
    a plurality of arms extending outwardly from said shaft,
    wherein said toy is a homogeneous, one-piece molding formed from a resilient, chewable material and
    wherein said base provides a restorative uprighting force by having the weight of the toy concentrated in said base.

8. A chewable, resilient self-righting pet toy, comprising:
    a base having a curved bottom portion, an upper surface and a plurality of ribs provided on said upper surface.

* * * * *